United States Patent [19]

Mise

[11] Patent Number: 4,669,833

[45] Date of Patent: Jun. 2, 1987

[54] SPOTTING SCOPE WITH ALIGNMENT VIEWER

[75] Inventor: Minoru Mise, Asaka, Japan

[73] Assignee: Simmons Outdoor Corporation, Miami, Fla.

[21] Appl. No.: 695,078

[22] Filed: Jan. 25, 1985

[51] Int. Cl.$^4$ .............................................. G02B 23/00
[52] U.S. Cl. ................................................... 350/558
[58] Field of Search ................................. 350/557–558, 350/562, 566–567, 574, 577, 565; 356/247, 251–252

[56] References Cited

U.S. PATENT DOCUMENTS

| 828,511 | 8/1906 | Saegmuller | 350/557 |
| 1,272,214 | 7/1918 | Camus | 350/545 |
| 2,424,011 | 7/1947 | De Gramont | 350/567 |
| 3,503,318 | 3/1970 | De La Cierva | 350/566 |
| 4,408,842 | 10/1983 | Gibson | 350/562 |

FOREIGN PATENT DOCUMENTS 814230   6/1959   United Kingdom ................ 350/562

*Primary Examiner*—William H. Punter
*Attorney, Agent, or Firm*—Kokjer, Kircher, Bradley, Wharton, Bowman & Johnson

[57] ABSTRACT

A optical spotting scope in combination with an optical alignment viewer which includes a spotting scope body; a optical spotting scope lens system mounted within the spotting scope body to provide an optical axis therethrough and to further provide high power magnification of distant images within the field of view of the spotting scope lens system; a view finder body rigidly joined to the spotting scope body; and a optical viewer lens system selected, mounted and arranged within the view finder body to provide an optical axis therethrough in substantial parallel alignment with the optical axis of the spotting scope lens system so that the field of view of the viewer lens system coincides with and includes the field of view of the spotting scope lens system, the viewer lens system being substantially lower power magnification than the spotting scope lens system; whereby a distant image visible centrally within the field of view of the viewer lens system, will fall within the field of view of the spotting scope lens system.

4 Claims, 5 Drawing Figures

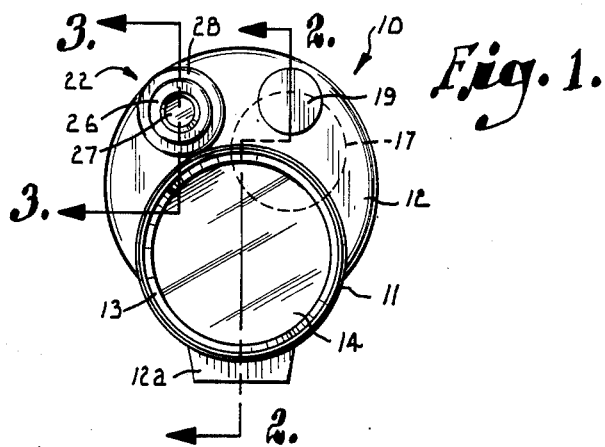
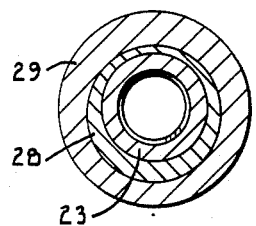
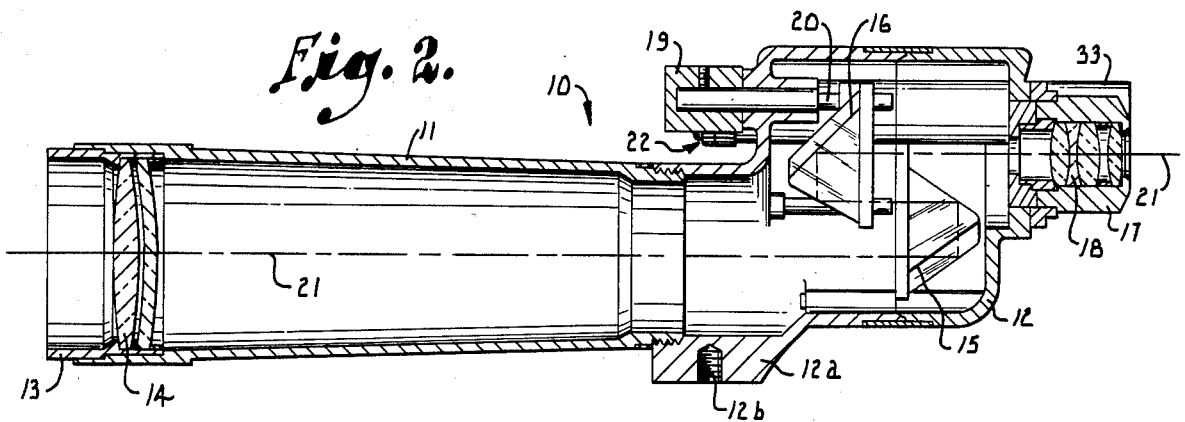
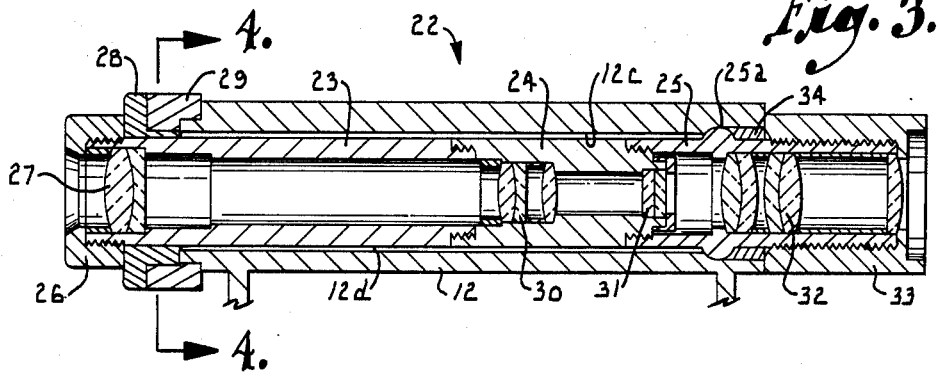
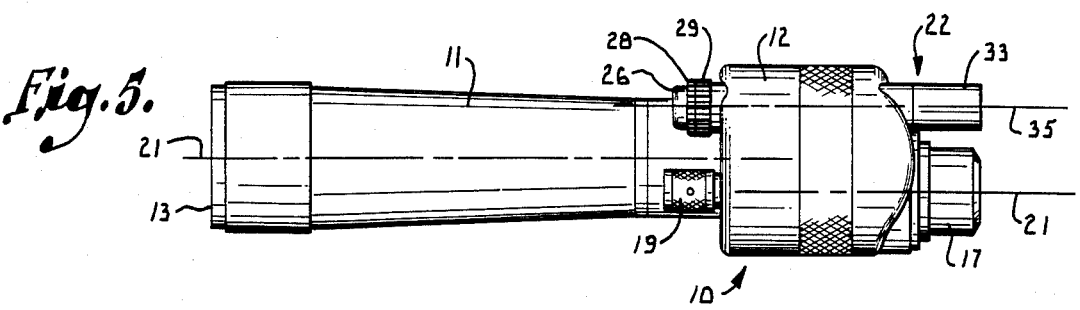

SPOTTING SCOPE WITH ALIGNMENT VIEWER

BACKGROUND AND SUMMARY OF THE INVENTION

This invention relates to a spotting scope with a built-in alignment viewer. More specifically, the invention relates to a high power spotting scope with a low power alignment viewer having optical crosshairs therein to centrally register with the field of view of the spotting scope to assist in aligning the spotting scope on a distant object.

Sportsmen, hunters, target shooters, bird watchers, wildlife observers and photographers are familiar in the advantages and uses of a high power spotting scope in carrying out their respective activities. Such spotting scopes may be of a fixed or variable power and, typically, may be equipped with a tripod to hold the scope reasonably steady for viewing a distant object such as wildlife or a target. In short, the purpose of the spotting scope is to permit the user to clearly view objects at a distance which would be difficult or impossible to see with the unaided eye.

The optics industry has developed certain terminology of which an understanding is helpful for a greater appreciation of the invention disclosed herein. The term "magnification" or "power" refers to the ability of an optical instrument to magnify the size of the image being viewed and is characteristically expressed by a number followed by an X. For example, a telescope having the ability to magnify an object four times larger than would be seen with the unaided eye is termed a 4X or four-power scope. Spotting scopes may be of a fixed power (e.g., 4X) or a variable power (e.g., 15-40X) which may be adjustably controlled to vary the amount of magnification. The term "field of view" is a measurement of the diameter of the picture that the observer sees when looking through an optical instrument and is usually expressed in feet at a particular distance. For example, the designation of field of view as being 150 feet at 1000 yards would indicate that the observer would see a view of approximately 150 feet in diameter at a distance of 1000 yards. Field of view is significantly influenced by the power of the optical instrument; field of view decreases as the power increases.

The users of spotting scopes are likewise familiar with the disadvantages and shortcomings of such devices. Due to the high power of magnification used in spotting scopes, characteristically in the range from 15 to 60 power, they normally have a fairly restricted field of view which makes aligning the spotting scope on the distant image confusing, tedious and extremely frustrating for most users.

To further explain the phenomena to the uninitiated, it could be assumed that on a distant limb sits a bird which the observer can, with the unaided eye, determine is a bird but can tell nothing more as to the type of bird or its other features. With the aid of a spotting scope, the observer could readily see the features of the bird. The spotting scope must first, however, be trained on the bird. When the observer looks through a conventional high power spotting scope, a portion of the tree may be seen but, due to the narrow field of view, the scope may not be properly aligned with the bird. Therefore, the observer must slowly move the scope until the bird comes into view. In most situations this is much easier said than done. Small movements of the scope cover large areas at a distant which appear to move very quickly in the scope and thus confuse the observer. While the alignment process is underway, there is of course the danger that the bird will fly before it can even be found in the scope. This only adds to the frustration that the observer may feel in such circumstances.

There is a need, therefore, in the optical industry for a spotting scope which can be quickly and accurately trained on a distant image. The primary goal of this invention is to fulfill this need.

More specifically, an object of the invention is to provide a conventional spotting scope equipped with an alignment viewer in which the optical axis of the viewer is substantially parallel with the optical axis of the spotting scope to permit the observer to utilize the viewer in training the spotting scope on a distant image.

Another object of the invention is to provide a spotting scope with alignment viewer of the character described wherein the viewer includes crosshairs to serve as a visual indication of the field of view of the spotting scope.

An additional object of the invention is to provide a spotting scope with alignment viewer of the character described wherein the viewer is of low power magnification compared to the magnification of the spotting scope to facilitate the process of training the scope on a distant image.

A further object of the invention is to provide a spotting scope with alignment viewer of the character described which is of rugged and durable construction to permit use in outdoor activity without detrimental effect to the equipment.

Yet another object of the invention is to provide a spotting scope with alignment viewer of the character describe which is economical to manufacture and assemble.

Other and further objects of the invention, together with the features of novelty appurtenant thereto, will appear in the description of the drawings.

In summary, the invention provides a spotting scope with alignment viewer which includes a spotting scope body; a optical spotting scope lens system selected, mounted and arranged within the spotting scope body to provide an optical axis therethrough and to further provide high power magnification of distant images within the field of view of the spotting scope lens system; a view finder body rigidly joined to the spotting scope body; and a optical viewer lens system selected, mounted and arranged within the view finder body to provide an optical axis therethrough in substantial parallel alignment with the optical axis of the spotting scope lens system whereby the field of view of the viewer lens system coincides with and includes the field of view of the spotting scope lens system, the viewer lens system being substantially lower power magnification than the spotting scope lens system; whereby a distant image visible centrally within the field of view of the viewer lens system will fall within the field of view of the spotting scope lens system.

DESCRIPTION OF THE DRAWINGS

In the following description of the drawings, in which like reference numerals are employed to indicate like parts in the various views:

FIG. 1 is a front elevational view of a spotting scope with alignment viewer constructed in accordance with a preferred embodiment of the invention;

FIG. 2 is a side sectional view of the spotting scope taken along line 2—2 of FIG. 1 in the direction of the arrows;

FIG. 3 is a side sectional view through the alignment viewer taken along line 3—3 of FIG. 1 in the direction of the arrows;

FIG. 4 is a sectional view through the alignment viewer taken along line 4—4 of FIG. 3 in the direction of the arrows to illustrate the eccentric adjustment mechanism of the viewer; and FIG. 5 is a top plan view of the spotting scope with alignment viewer to illustrate the relationship of the optical axis of the viewer to the optical axis of the scope.

Referring first to FIGS. 1, 2 & 5 in greater detail, portions of a conventional spotting scope are illustrated. The spotting scope, designated generally by the numeral 10, is constructed in accordance with principles known to those skilled in the optical arts and includes an elongate scope tube 11 connected to a rear housing 12. An objective lens cap 13 holds an objective lens set 14 within the outer end of the scope tube 11. Mounted interiorly of the housing 12 are a pair of prisms 15 & 16 to direct the light path through the spotting scope 10. On the rear of the housing 12 is mounted an eyepiece 17 which holds an ocular lens set 18. A rotatable focus knob 19 projects forwardly from the housing 12 and is connected to a conventional focusing mechanism 20 to enable the user to obtain a clearly focused view of a distant image. The bottom portion of the housing 12 is formed as a base 12a having a threaded bore 12b therein for mounting the spotting scope 10 on a tripod (not shown) in conventional fashion.

The optical axis of the spotting scope 10 is indicated by the broken line and numeral 21 in FIGS. 2 & 5. Light entering the objective lens passes through the scope tube 11 and housing 12 to project on the lower prism 15. The lower prism 15 redirects the light path to the upper prism 16 which then reflects the light path through the ocular lens set 18 of the eyepiece 17 to the observer. Thus, the light path is bent in an offset or square-S configuration when traveling through the spotting scope 10.

The lens system for a spotting scope 10 to be used in this invention is characterized as high power optics. This includes both fixed and variable power lens systems in the magnification range of approximately 15X up to much higher powers which approach the upper limit of spotting scopes found useful in outdoor activities. Generally, due to weight and size considerations, a practical upper power limit on spotting scopes would be less than 80X.

Referring now to the alignment viewer 22 in greater detail, the rear housing 12 includes a portion adjacent the eyepiece 17 of the spotting scope 10 formed as a tubular passage 12c through the housing 12. Within the tubular passage 12c are successively assembled forward, intermediate and rear tubes 23, 24 & 25, respectively. The diameters of tubes 23, 24 & 25 are less than the inside diameter of passage 12c to provide an annulus 12d therebetween. Mounted within the forward end of the forward tube 23 by an objective lens cap 26 is an objective lens set 27. Rearwardly of the lens cap 26, the forward tube 23 rotatably carries a first eccentric ring 28 which, in turn, itself carries a second eccentric ring 29. The second eccentric ring 29 rotatably engages both the first eccentric ring 28 and the housing 12.

Mounted within the forward end of the intermediate tube 24 is an erector lens set 30 to project images right side up and in the appropriate left-to-right perspective. Installed in the rearward end of the intermediate tube 24 is a crosshairs reticle 31 to impose a fine cross upon the scene the observer sees when looking through the viewer 22. The crosshairs of the reticle 31 are substantially centered upon the field of view of the viewer 22. Interiorly of the rear tube 25 is assembled an ocular lens set 32 and the rearward end of the rear tube 25 is threaded to receive an eyepiece 33.

The lens system used in the viewer 22 of this invention is characterized as relatively low power optics. This includes both fixed and variable power lens systems in the magnification range of approximately 1X up to 6X which approaches the upper limit of magnification power where most people begin experiencing difficulties in training an optical device on a distant image. A preferred magnification range is 3X to 4X. Likewise, the field of view of the lens system chosen for the viewer 22 is desirably broader than the field of view used in the spotting scope 10.

The exterior surface of the rear tube 25 includes a convex rib 25a which mates with a corresponding concave surface within the tubular passage 12c to achieve a limited ball-and-socket type of fit. The convex rib 25a is held in place by a flexible seal 34 in the end of the tubular passage 12c of the housing 12. Accordingly, the forward, intermediate and rear tubes 23, 24 & 25 are securely connected together to form a unitary construction having limited up-and-down and sideways movement within the tubular passage 12c on the convex rib 25a until the objective lens cap 26 and eyepiece 33 are snugly tightened against the housing 12.

During the assembly process, the viewer 22 is installed as described in the housing 12 with the objective lens cap 26 and eyepiece 33 thereof only lightly tightened. The first and second eccentric rings 28 & 29 may then be rotated as necessary to cause the crosshairs of the reticle 31 to centrally register with the field of view of the spotting scope 10. When this adjustment has been accomplished, the objective lens cap 26 and eyepiece 33 are securely tightened to lock the optical axis 35 of the viewer 22 in proper alignment with the optical axis 21 of the spotting scope 10 as shown in FIG. 5.

A wide variety of adjustment mechanisms may be used instead of the eccentric rings 28 & 29 previously described. For example, radially spaced set screws could be tapped in the housing 12 to bear against the forward end of the forward tube 23. The intent and purpose, however, is to provide some adjustable feature for centrally registering the reticle 31 of the viewer 22, and thus the entire lens system of the viewer 22, with the field of view of the spotting scope 10.

In use, the observer utilizes the low power viewer 22 with its relatively broader field of view to scan the surroundings. When the crosshairs of the viewer 22 are centered on a distant image to be examined with the high power spotting scope 10, the observer's eye can be transferred from the eyepiece 33 of viewer 22 to the eyepiece 17 of the spotting scope 10. The distant image will already be within the field of view of the spotting scope 10 and focusing adjustments with the focus knob 19 can be readily accomplished.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described my invention, I claim:

1. A sportsman's spotting scope with alignment viewer comprising in combination:

a spotting scope body;

a optical spotting scope lens system selected, mounted and arranged with said spotting scope body to provide an optical axis therethrough and to further provide high power magnification in the range of 15X and 80X of distant images within the field of view of said spotting scope lens system;

a view finder body rigidly joined to said spotting scope body; and a optical viewer lens system selected, mounted and arranged within said view finder body to provide an optical axis therethrough in substantial parallel alignment with said optical axis of said spotting scope lens system whereby the field of view of said viewer lens system coincides with and includes the field of view of said spotting scope lens system, said viewer lens system being substantially lower power magnification than said spotting scope lens system, said lower power magnification being in the range of 1X to 6X;

optical centering means mounted within said view finder body to provide a visual indication of the central region of the field of view of said viewer lens system, said optical centering means comprising a crosshair reticle mounted and arranged with said viewer lens system to superimpose a fine cross upon the view seen through said viewer lens system;

adjustment means connected to said viewer lens system to adjustably vary the central point of the field of view thereof to coincide with and overlie the field of view of said spotting scope lens system, said adjustment means including a pair of eccentric rings operably interconnecting said optical axis of said viewer lens system and said view finder body to vary the alignment of said optical axis of said viewer lens system with respect to said optical axis of said spotting scope lens system;

whereby a distant image visible centrally within the field of view of said viewer lens system will fall within the field of view of said spotting scope lens system to aid in aligning the spotting scope with a distant image.

2. The spotting scope with alignment viewer as in claim 1, said spotting scope body and said view finder body being intergrally formed to rigidly fix the alignment therebetween.

3. The spotting scope with alignment viewer as in claim 1 wherein the magification of said viewer lens system falls in the range of 3X to 4X.

4. The spotting scope with alignment viewer as in claim 1 wherein said spotting scope lens system includes an ocular eyepiece and said viewer lens system includes an ocular eyepiece in close proximity to said eyepiece of said spotting scope lens system.

* * * * *